United States Patent [19]
Kawanishi et al.

[11] Patent Number: 5,825,952
[45] Date of Patent: Oct. 20, 1998

[54] OPTICAL CIRCUIT ELEMENT AND AN INTEGRATED TYPE OPTICAL CIRCUIT DEVICE

[75] Inventors: Hidenori Kawanishi, Nara; Atsushi Shimonaka, Yamatokoriyama, both of Japan

[73] Assignee: Sharp Kabushiki Kaisha, Osaka, Japan

[21] Appl. No.: 742,494

[22] Filed: Nov. 1, 1996

[30] Foreign Application Priority Data

Nov. 6, 1995 [JP] Japan .................................... 7-287176

[51] Int. Cl.⁶ .................................................. G02B 6/421
[52] U.S. Cl. ............................ 385/47; 385/14; 385/321; 385/147
[58] Field of Search ................................ 385/47, 31, 14, 385/901, 15, 32, 39, 44, 45, 48, 123, 147; 362/32

[56] References Cited

U.S. PATENT DOCUMENTS

| | | | |
|---|---|---|---|
| 4,285,571 | 8/1981 | Winzer | 385/47 X |
| 5,432,876 | 7/1995 | Appeldorn et al. | 385/47 X |

FOREIGN PATENT DOCUMENTS

| | | |
|---|---|---|
| 4151886 | 10/1990 | Japan . |
| 6112904 | 7/1993 | Japan . |

OTHER PUBLICATIONS

Yasuo Shibata et al. "Semiconductor Optical Branching Circuit with Total–Reflecting Mirror" 52nd General Presentation Assembly, Society of Applied Physics, Japan, Oct. 1991: p. 1010.

*Primary Examiner*—Phan T. H. Palmer

[57] ABSTRACT

An optical circuit element has a beam splitter which is formed with a plurality of grooves in optical waveguides, or formed in such a manner that the central axes of the waveguides to be coupled are set off from one another or the shape of the waveguides is modified. Further, an integrated type optical circuit device include: an optical circuit element having a plurality of optical waveguides on the input side and having a beam splitter which is formed with a plurality of grooves in the optical waveguides to split the light guided through the optical waveguides: and plural kinds of input light generating sources each arranged corresponding to one of the optical waveguides on the input side.

21 Claims, 9 Drawing Sheets

OPTICAL CIRCUIT ELEMENT AND AN INTEGRATED TYPE OPTICAL CIRCUIT DEVICE

BACKGROUND OF THE INVENTION (1) Field of the Invention

The present invention relates to an optical circuit element which can be used for optical communications, optical information processing, optical sensing, etc., in particular relating to an optical circuit element having a beam splitter and an integrated type optical circuit element as well as an integrated type optical circuit device using the optical circuit element.

(2) Description of the Prior Art

FIG. 1 shows a conventional beam splitting element which has previously been proposed (see Japanese Patent Application Laid-Open Hei 4 No.151,886). This element receives light through a waveguide 1000 on the input side and splits it into two waveguides 1001 and 1003 on the output side by using a slit-like groove 1005 as a total reflective mirror.

However, in the above conventional example, since there is poor conformability between the distribution of the field at the beam splitting position and the eigen-mode (or natural mode) of the waveguides on the output side, a critical mode-converting loss occurs during the course from the beam splitter to the waveguides on the output side.

FIG. 2 schematically shows the distributions of the fields of a guided light beam before the incident on the beam splitter (to be referred to as a BS) and after the BS. As understood from this figure, the distributions of the fields of the light after the BS have no symmetry (in the figure, the blackened parts show the absence of the light), and therefore the resulting light beams have poor mode conformability to the eigen-mode of the waveguides on the output side (the same as the distributions of the fields of a guided beam before the incident on the BS). The inventors hereof confirmed empirically the fact that the loss attributed to the mode conversion through each passage in the above two waveguides on the output side is about 50%. The loss of this extent is fatal for the processing of information using a very weak light beam.

The applicants of the invention have previously proposed a system of a waveguide type optical combiner as a part of a coherent photodetector in the receiver of a wireless optical transmitting system in Japanese Patent Application Laid-Open Hei 6 No.112,904. The apparatus using the system is the one which transmits information by means of coherent beams that propagate through free space, and is composed of: a transmitter having the function of modulating the reference frequency (wavelength) or phase of a coherent beam radiated from the light emitting source in conformity with the signal and the function of radiating the modulated beam in the form of scattered light having a power density which is safe for human eyes; and a receiver having the function of outputting a locally generated coherent beam, the function of photoelectric conversion after the mixing of the signal beam and the locally generated beam, the function of discriminating the frequencies of a.c. components of the photoelectrically converted output and the function of reproducing signals based on the frequency discriminated output, and moreover either the transmitter or the receiver has the function of keeping constant the relative frequency difference (wavelength difference) between the signal beam and the locally generated beam, thus enabling wireless transmission of information such as motion pictures, etc.

SUMMARY OF THE INVENTION

It is therefore an object of the invention to minimize the loss at the beam splitting portion.

In order to attain the above object, a beam splitter of the invention has a plurality of reflective portions having a certain reflecting ratio in the beam splitting portion.

In order to reduce the loss due to the mode conversion, the central axes of the optical waveguides on the output side are set by a certain distance off the central axes of the optical waveguides on the input side. Alternatively, the width of the waveguide on the output side is varied continuously or step-wise.

These and other objects may be attained as follows:

In accordance with the first aspect of the invention, an optical circuit element comprises a beam splitter which is formed with a plurality of grooves in optical waveguides to split the light guided through the optical waveguides.

In accordance with the second aspect of the invention, an optical circuit element has the first feature wherein the grooves are formed on both ends on a beam splitting plane in the optical waveguides.

In accordance with the third aspect of the invention, an optical circuit element has the first feature wherein the grooves are formed on a beam splitting plane in the optical waveguides so as to divide the guided light into plural beams and the divided beams are all wider than $1/10$ of the wavelength of the light inside the optical waveguide.

In accordance with the fourth aspect of the invention, an optical circuit element has the first feature wherein the grooves are formed so that the depth of the grooves exceeds the peak of the distribution of the field of light.

In accordance with the fifth aspect of the invention, an optical circuit element has the third feature includes optical waveguides, wherein the formed area of the grooves is substantially on a line or is shaped substantially in the form of a triangle when the formed area is viewed from the top of the grooves.

In accordance with the sixth aspect of the invention, an optical circuit element is characterized in that the light guided through the optical waveguides is split by grooves formed in the optical waveguides and the optical axis of the optical waveguide on the input side before the splitting position is set off that of the optical waveguide on the output side after the splitting position by about 20 to 50% of the width of the optical waveguide on the input side.

In accordance with the seventh aspect of the invention, an optical circuit element has the sixth feature wherein the grooves are formed in the form of slits on an optical splitting plane so that the guided light is divided.

In accordance with the eighth aspect of the invention, an optical circuit element has the sixth feature wherein the grooves are provided in the form of cutout portions on an optical splitting plane so that the guided light is divided.

In accordance with the ninth aspect of the invention, an optical circuit element has the sixth feature characterized in that two optical waveguides on the output side are made to intersect each other on the beam splitting plane and the intersecting angle is substantially 90°.

In accordance with the tenth aspect of the invention, an optical circuit element has the sixth feature wherein the light guided through optical waveguides is split by grooves formed in the optical waveguides and the width of the optical waveguide on the input side before the beam splitting position is greater than that of the optical waveguide on the output side after the beam splitting position.

In accordance with the eleventh aspect of the invention, an optical circuit element has the sixth feature wherein the width of the optical waveguide on the output side is increased near the intersecting portion than in the other part.

In accordance with the twelfth aspect of the invention, an optical circuit element includes optical waveguides, wherein the light guided through the optical waveguides is split by grooves formed in the optical waveguides and the grooves are formed with a depth which is halfway of the peak of the field of light, and the width of the groove is formed so as to hold the peak light in the horizontal direction and is sufficiently greater than the distribution of the field of light.

In accordance with the thirteenth aspect of the invention, an integrated type optical circuit device comprises: an optical circuit element having a plurality of optical waveguides on the input side and having a beam splitter which is formed with a plurality of grooves in the optical waveguides to split the light guided through the optical waveguides; and a plurality of input light generating sources each arranged corresponding to one of the optical waveguides on the input side.

In accordance with the fourteenth aspect of the invention, an integrated type optical (circuit device comprises: an optical circuit element having a plurality of optical waveguides on the input side and wherein the light guided through the optical waveguides is split by grooves formed in the optical waveguides and the optical axis of the optical waveguide on the input side before the splitting position is set off that of the optical waveguide on the output side after the splitting position by about 20 to 50% of the width of the optical waveguide on the input side; and a plurality of input light generating sources each arranged corresponding to one of the optical waveguides on the input side.

In accordance with the fifteenth aspect of the invention, an integrated type optical circuit device comprises: an optical circuit element having a plurality of optical waveguides on the input side and wherein the light guided through optical waveguides is split by grooves formed in the optical waveguides and the grooves are formed with a depth which is halfway of the peak of the field of light and the width of the groove is formed so as to hold the peak light in the horizontal direction and is sufficiently greater than the distribution of the field of light; and a plurality of input light generating sources each arranged corresponding to one of the optical waveguides on the input side.

The operation of the invention thus configured is as follows:

As stated above, when a multiple number of reflective portions having a certain reflecting ratio are arranged in the beam splitting position, the conformability of the distribution of the field of light at the beam splitting position to the eigen-mode of the waveguide on the output side becomes better with the augment of the number of the reflective portions. Thus, the mode converting loss occurring from the beam splitting position toward the waveguide on the output side becomes small.

Further, it is also possible to better the conformability of the distribution of the field of light at the beam splitting position to the eigen-mode of the waveguide on the output side, by setting the central axis of the optical waveguide on the output side by a certain distance off that of the optical waveguide on the input side. Thus, the mode converting loss occurring from the beam splitting position toward the waveguide on the output side becomes small. Moreover, by varying the width of the optical waveguide on the output side in a continuous or step-wise manner, it is possible to suppress the optical coupling loss between the waveguides.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Next, embodiments of the invention will be explained in detail with reference to the drawings.

(Embodiment 1)

Figure 3:
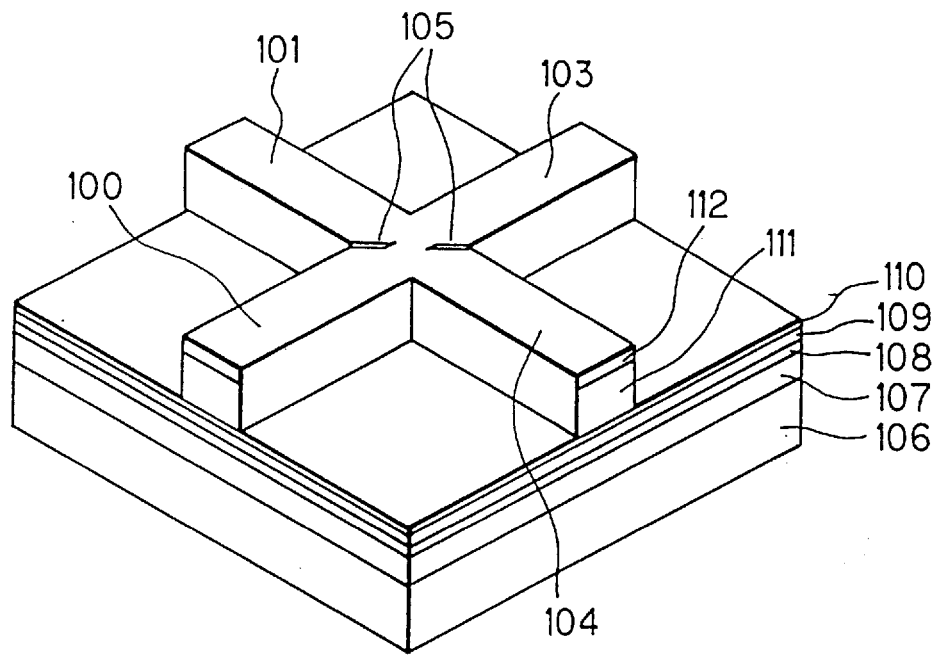
FIG. 3 is a perspective view showing a waveguide type optical combiner of the invention.

FIG. 3 is an example of an optical circuit element in which the present invention is applied to an optically coherent process. Specifically, FIG. 3 is a perspective view showing a waveguide type optical combiner which constitutes a coherent photodetector in the receiver of a wireless optical transmitting system. This detector has the function of combining the received signal beam and a locally generated beam and outputting the combined result. The output beam from a semiconductor laser (not shown) incorporated in the receiver as a local generator is used as the locally generated beam. Since the signal beam carries information to be transmitted in the form of, for example, frequency modulated (FM) signal, when the frequency of the locally generated beam is adjusted to the reference frequency of the transmitted beam, the information will be able to be extracted as the beats between the signal beam and the locally generated beam in the output from the detector.

The optical combiner of FIG. 3 is made of a semiconductor waveguide of GaAs/AlGaAs and has a structure in which two ridge waveguides are made in a cross. The intersecting portion of the two waveguides is made with a pair of deep grooves 105 each of which is angled at 45° with the length-wise directions of the two waveguides so that these portions function as a beam splitter (to be referred to as BS) of the invention. The signal beam emitted from the transmitter propagates through space to reach the receiver and is introduced through a lens (not shown) to a waveguide 100 which is one of the two input waveguides of the optical combiner. The signal beam propagates through waveguide 100 to the BS where the light beam is split in two directions: these split beams are made to go to waveguides 103 and 104 on the output side so as to be emitted from the end faces thereof. The locally generated beam emitted from the local oscillator is similarly introduced through a lens (not shown) to another input waveguide 101 of the optical combiner. The locally generated beam propagates through waveguide 101 and is split in two by means of the BS in a similar manner to that of the signal beam. These split beams are made to go through waveguides 103 and 104 and emitted from the end faces thereof. In this way, the outputs from waveguides 103 and 104 on the output side will be composed of some of the signal beam and some of the locally generated beam. Accordingly, when the output beam is photoelectrically converted by means of a photodiode etc., so that the beat signal contained in the output is detected, it is possible to obtain the desired information.

Next, description will be made of a fabrication method of this beam splitter. First, the following layers were grown on a GaAs substrate 106 by a method of molecular beam epitaxy (MBE): a first light confinement layer 107 of $Al_{0.5}Ga_{0.5}As$ having a thickness of 1 μm; an optical waveguide layer 108 of $Al_{0.3}Ga_{0.7}As$ having a thickness of 0.3 μm; a second light confinement layer 109 of $Al_{0.5}Ga_{0.5}As$ having a thickness of 0.5 μm, an etch stopper layer 110 of GaAs having a thickness of 3 nm; a third light confinement layer 111 of $Al_{0.5}Ga_{0.5}As$ having a thickness of 0.5 μm; and a surface protecting layer 112 of GaAs having a thickness of 50 nm.

Then, in order to form the cross-shaped ridge waveguides, a resist pattern of 2 μm wide was formed on the wafer by normal photolithography. The pattern was transferred by etching halfway the third light confinement layer 111 with an etchant of sulfuric acid and selective etching with hydrofluoric acid. Since hydrofluoric acid could etch only $Al_{0.5}Ga_{0.5}As$ (third light confinement layer 111) while it could not etch GaAs (etch stopper layer 110), the etching stopped at the surface of the GaAs etch stopper layer 110. After the removal of the resist using an organic solvent, another resist was applied again onto the surface. This process, application of resist and baking at 150° C. was repeated twice so that a flat resist (bottom resist) without any step between the area where ridges were to be formed and the other areas on the surface could be formed. Next, an SOG (spin-on-glass) film of 1,000 Å thick was formed on the top using a spinner and was baked at 200° C. In order to etch the deep grooves 105 by the normal lithography, another resist layer (top resist) was applied on it forming a pattern of two rectangles of 2 μm wide 0.5 μm long 1.2 μm apart from one another. This pattern was transferred on the SOG film by RIE (reactive ion etching) using $CF_4$. This pattern was further transferred to the bottom resist by RIE using $O_2$. Thus, despite the fact that there were level differences on the surface because of the three-layer resist process, it became possible to form a desired shape across the stepped portions. Then the pattern was transferred to the substrate by the method of CAIBE (chemically assisted ion beam etching) in which chlorine gas and argon ion beam were simultaneously applied using the resist pattern as the mask. In this process, the etching depth was 3.5 μm. Detail of this process will be found in, for instance, Gei et al. (J.Vac. Sci. Technol. 19, 1390 (1981) or Scherer et al. (Appl. Phys. Lett. 55, 2724 (1989). By this process, etching of cleanly formed vertical sections could be achieved. Thereafter, three layered resist was removed by RIE to finish the beam splitter.

Here, the depth of etching was 3.5 μm.

In this embodiment, the deep grooves are formed so as to exceed the peak of the distribution of the field of light, it becomes possible to neglect the transmission of light through the areas. Therefore, it is possible to obtain a splitting ratio of light which is defined only by the mask pattern.

Figure 4:
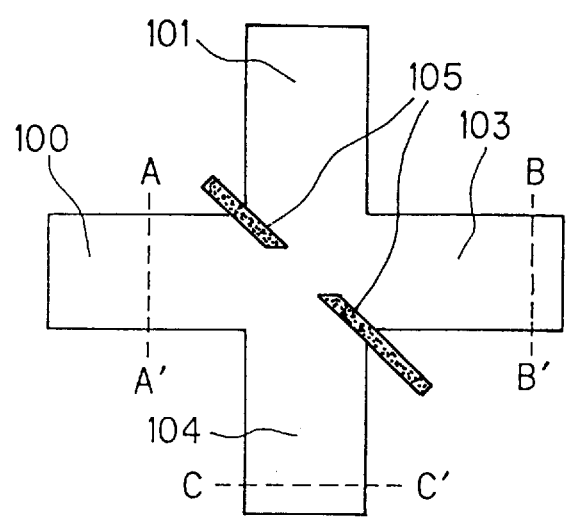
FIG. 4 is a top view of FIG. 3.
Figure 5:
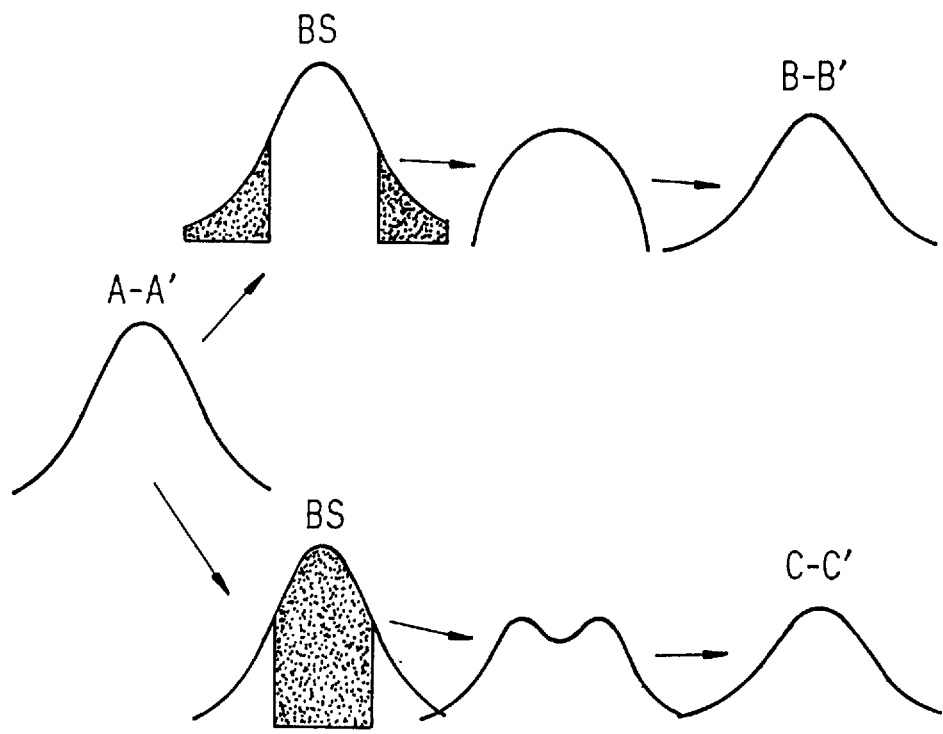
FIG. 5 is a diagram showing the distribution of the field of a signal light in the waveguides shown in FIG. 4 in a horizontal direction (parallel to each layer of the waveguides)
Figure 6:
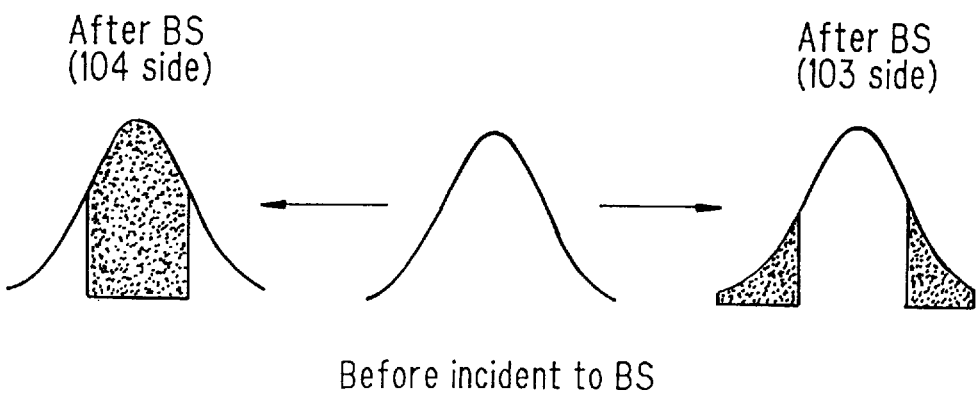
FIG. 6 is a diagram showing two distributions of the fields of light right after the BS shown in FIG. 4 in comparison to the distribution of the field of light just before the entrance to the BS.

Subsequently, the operation of the beam splitter (BS) will be detailed with reference to FIGS. 4 to 6. FIG. 4 is a top view of FIG. 3 wherein reference numerals correspond to those in FIG. 3. Since the signal light and locally generated light will basically behave in the same manner, the description will be made only of the signal light. As the signal light, a laser beam of the 780 nm band was used. FIG. 5 schematically shows the distribution of the field of the signal light in the waveguides in a horizontal direction (parallel to each layer of the waveguides). Since input waveguide 100 was of a single transversal mode, the signal light introduced to input waveguide 100 propagated in the fundamental eigen-mode of waveguide 100, and the distribution of the field of light at a section A–A' therein was as shown. Although the distribution of the field of the light which was condensed at the incident end face of waveguide 100 by means of an unillustrated lens did not correspond to the eigen-mode of the waveguide, the light was converted into the eigen-mode during the propagation through the waveguide to reach the BS. Here, the interior of deep grooves 105 of the BS portion was full of air therefore the index of refraction was 1. On the other hand, since the effective index of refraction which the guided light wave underwent was rather great, specifically, about 3.5, part of the light having propagated through waveguide 100 was totally reflected by deep grooves 105 of the BS.

Figure 1:
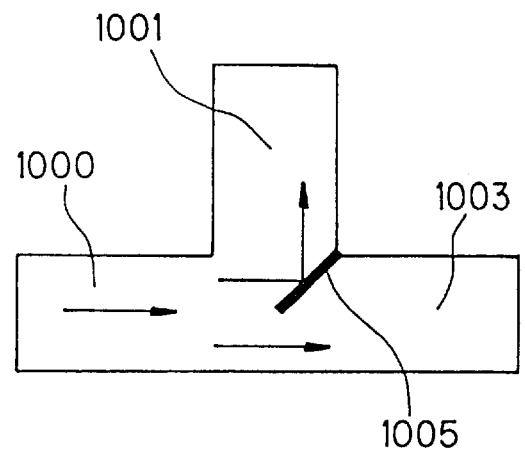
FIG. 1 is a schematic view showing a conventional beam splitting element which has been previously proposed.
Figure 2:
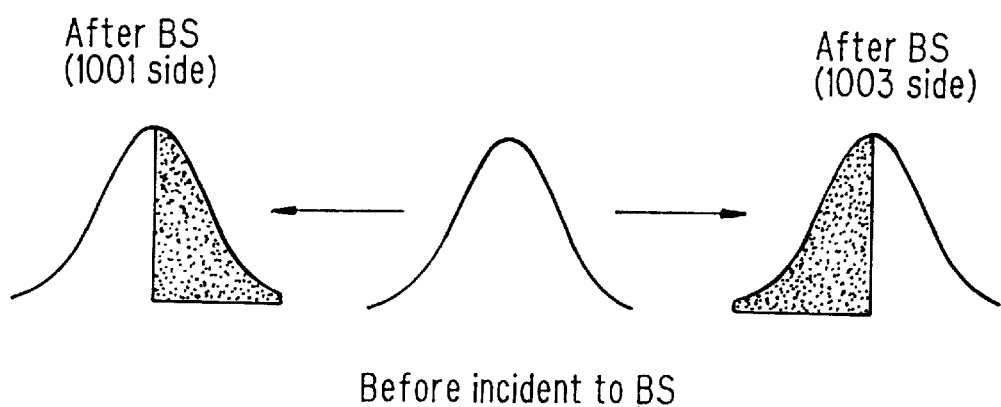
FIG. 2 is a schematic view showing the distributions of the fields of a guided light beam before and after being incident on a conventional beam splitter.

Since light passing through the area other than deep grooves 105 was not affected, it propagated directly through the waveguide. At this stage, the guided light beam has been split spatially into two parts: one goes directly toward waveguide 103; the other is deflected 90° and goes toward waveguide 104. FIG. 5 also shows the change in the horizontal distributions of the fields of light as the guided light beams propagate. The guided light waves which were partially extracted from the incident light of the transverse mode by means of the BS, were converted into the fundamental mode whilst traveling through respective waveguides 103 and 104. Thus, both the waves were found to be converted into the fundamental mode when they reached B–B' and C–C'. The result could be confirmed by cleaving the element at certain points such as B–B', C–C' along the course of the waveguides and observing the distributions of the fields of light by a microscopic investigation. FIG. 6 shows two distributions of the fields of light right after the BS in comparison to the distribution of the field of light just before the entrance to the BS. Comparing with the conventional example shown in FIG. 2, the distributions of the fields of guided light beams right after being incident on the BS are found to be symmetric, thus it is understood that the conformability to the fundamental mode of the waveguides on the output side was improved. In practice, when the mode converting loss was measured in the above case, the loss was bettered from about 50% in the conventional example to about 20%. In this embodiment, the two input and output waveguides cross at right angles and the incident/outgoing end faces of light on and from the waveguides use the cleavage planes of the semiconductor. These planes are perpendicular to the waveguides so that light will be incident on or exit from the element relatively easily.

(Embodiment 2)

Figure 7:
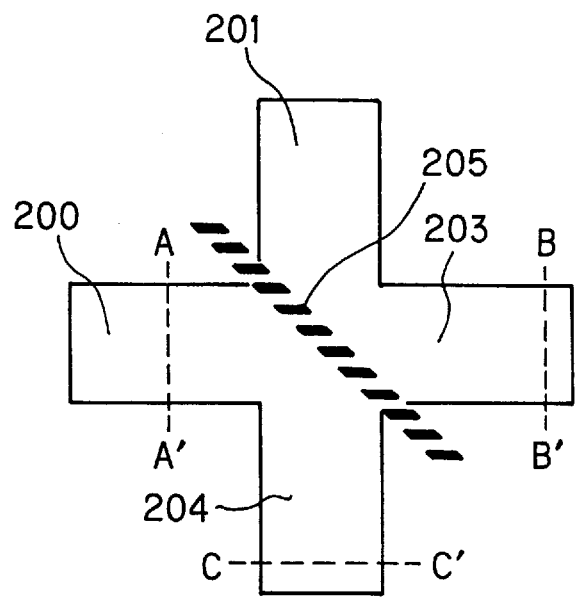
FIG. 7 is a top view showing a waveguide type optical combiner of another embodiment of the invention.
Figure 8:
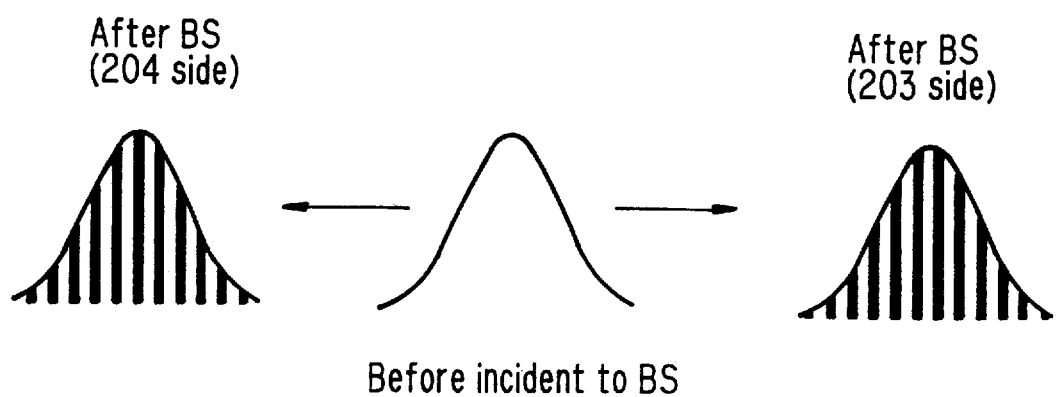
FIG. 8 is a diagram showing two distributions of the fields of light right after the BS shown in FIG. 7 in comparison to the distribution of the field of light just before the entrance to the BS.

FIGS. 7 and 8 show another embodiment of the invention in which an increased number of deep grooves for totally reflecting the guided light beam are provided. The wavelength of light used in this embodiment was of the 1.55 μm band, the device element was investigated by using materials of InGaAsP. Since the layered structure is similar to that of embodiment 1, no illustration is shown here. The procedure of fabrication is as follows: First, several layers were grown on an InP substrate by a method of metal organic chemical vapor deposition (MOCVD): a first light confinement layer InP having a thickness of 1 μm, an optical waveguide layer of multiple quantum wells (MQW) of InGaAs/InGaAsP having a thickness of 0.2 μm and a second light confinement layer of InP having a thickness of 1 μm. Here, the MQW layer was composed of an InGaAs well layer of 80 Å thick and InGaAsP barrier layer (1.15 μm composition) of 150 Å thick with four wells.

Next, an $SiO_2$ film of 2,000 Å thick was formed on the wafer surface using the plasma CVD method. On the top of the film, a resist material for exposure to electron beams was applied with a thickness of 1 μm so that a mask pattern for producing deep grooves 205 was formed on the resist surface. As shown in the figure, in order to create a number of reflective portions, the size was 0.5 μm long, 0.3 μm wide and they are arranged at intervals of 0.6 μm. This pattern was transferred to the $SiO_2$ film by RIE using $CF_4$ and further transferred to the wafer by RIBE (reactive ion beam etching) using a mixture gas of chlorine and argon. The depth of etching was 3 μm and etching of cleanly formed vertical sections with smooth surfaces could be achieved as in embodiment 1.

Then, in order to form the cross-ridge waveguides, a resist pattern was formed on the wafer by normal photolithography. In this case, the resist pattern was scarcely affected by the presence of the unevenness on the wafer surface. This can be explained by the fact that each etched area was very small so that the etched areas were promptly filled up. Since the width of the ridge waveguides was set at 5 μm, the resulting waveguides were of a multi-mode type which allows the existence of higher modes. The pattern was aligned using a normal aligner with aligning precision of 1 μm. The pattern was formed by the same RIBE as used for creating deep grooves 205 but the etching was stopped 0.2 μm above the MQW optical waveguide layer. The depth of etching was controlled by performing the etching whilst monitoring the current flowing through the ion supporting electrode of the RIBE apparatus. This current is proportional to the actual current density of the ion irradiating the substrate. The depth of etching is a function of ion current density, gas pressure, degree of vacuum in the chamber and ion sputtering voltage. Gas pressure, degree of vacuum in the chamber and ion sputtering voltage can be directly observed. Though ion current density cannot be monitored directly, it is possible to monitor the current which flows through the ion sputtering electrode. In this way, it became possible to control the depth of etching within a precision of ±0.04 μm to complete the beam splitter.

Subsequently, the operation of the beam splitter (BS) will be detailed in reference to FIG. 8. Although the description will be made as to the signal light as in embodiment 1, the basic operation is the same as for locally generated light. An input waveguide 200 is multi-mode. Since the signal beam introduced to input waveguide 200 entered the waveguide in the fundamental transverse mode, the light propagated through the waveguide in the fundamental eigen-mode. The mechanism of splitting the light beam into two parts by means of the BS is the same as embodiment 1. FIG. 8 shows two distributions of the fields of light right after the BS in comparison with the distribution of the field of light just before the BS. In this case, a further improvement of the conformability to the fundamental mode of the waveguide on the output side can be clearly observed. In practice, when the mode converting loss was measured, the loss was bettered from about 50% in the conventional example and about 20% in embodiment 1, to about 5%.

When the positions of deep grooves 205 deviated about 0.5 μm from the predetermined positions, the variation of the splitting ratio which could be attributed to the deviation was about 1%. Since the formed area of deep grooves 205 was made much greater than the 5 μm width of the waveguide, the influence due to the deviation could be considered to be absorbed. This variation is very small compared to the conventional example (25%). Thus the validity of the invention was verified.

The conventional configurations have suffered from the following problems.

Since the beam splitting ratio is determined by the ratio of the area of the reflective portions for reflecting light in the waveguide to the total section of the guided light beam, if the formed position of slit-like groove 1005 deviates, this fluctuates the splitting ratio, lowering the production yield of the device element.

Further, in the case where the above beam splitter is formed in the course of an optical waveguide of, for example, 3 μm wide, if the position of slit-like groove 1005 deviates 0.5 μm from the proper position, the splitting ratio will become 3:7. Some applications may require the splitting ratio to be strictly 1:1 (with a permissible error of 1% or less, for example). It is impossible for the conventional structure to deal with such a case. If the optical waveguide has a ridged structure, the depth of etching for the formation is shallower than the etching depth of slit-like groove 1005, therefore it is impossible to form the two at the same time. That is, two or more photolithographic steps are needed. The accuracy of positioning with mask alignment is 0.8 to 1 μm if a normal aligner is used. Even when a stepper is used, the accuracy cannot be suppressed smaller than 0.2 μm. Therefore, it is impossible for the current photolithographic technique to achieve the splitting ratio of 1:1 within a permissible error of 1% or less. As a method for alignment with high precision, there is an electron beam lithographic process. In this case, it is possible to perform positioning with accuracy of 0.1 μm or less. This method, however, needs to use an expensive positioning device such as an optical interferometer resulting in poor feasibility as a manufacturing method.

In accordance with the present embodiment, by using a mask pattern, it is possible to control and set the splitting ratio at 1:1 or a certain desired value within a permissible error of 1% or less.

Since the fluctuation of the splitting ratio due to the positioning displacement is small, there is no need to perform strict positioning.

In one word, it is possible to produce a device element whose coupling efficiency will little fluctuate depending upon the positioning accuracy at the production process of the device.

The above effects of the embodiment was confirmed as long as two or more grooves were formed and the width of the grooves was set greater than ¹⁄₁₀ of the wavelength of the light inside the waveguide.

Here, if deep grooves 205 are not deep enough and are shallower than the peak of the distribution of the field in the perpendicular direction to the light beam, some part of light transmits through such areas so that the splitting ratio will be affected. Therefore, it is preferable that deep grooves 205 should be formed deep enough to exceed the peak of the distribution of the field in the perpendicular direction to the light beam. In the case of the present embodiment, this condition is satisfied. That is, the width (here 0.3 μm) of light beams split by the deep grooves is sufficiently small compared to the transversal spread of the guided light beam before the BS, and therefore the splitting ratio is strictly defined by the ratio (here 50%) of the areas of the deep grooves to the total area. When this value is changed, it is possible to arbitrarily vary the splitting ratio.

(Embodiment 3)

Figure 9:
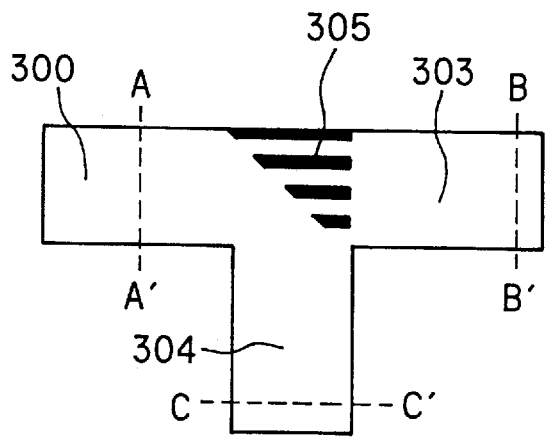
FIG. 9 is a top view showing a waveguide type optical combiner of a further embodiment of the invention.

FIG. 9 is a view showing another embodiment of an optical circuit element of the invention in which the shape of the deep grooves for totally reflecting the guided beam is modified. The wavelength of light used in this embodiment was of the 780 nm band and SiN/SiO$_2$ was used for the waveguide. The layered structure was similar to that of embodiment 1 and was formed by plasma CVD method. Each layer has the following thickness: an SiN optical waveguide layer has a thickness of 0.3 μm and a SiO$_2$ light confinement layer has a thickness of 1 μm. The producing procedures were almost the same as in embodiment 1 except that etching was performed by RIE using CF$_4$. In this case, the mode converting loss could be reduced and the variation of the splitting ratio could be suppressed so that improved characteristics could be attained.

(Embodiment 4)

Figure 10:
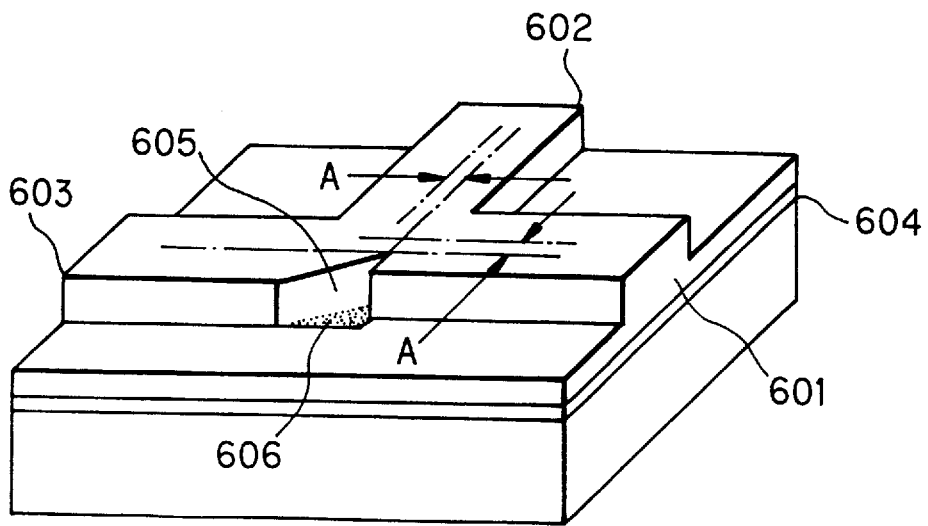
FIG. 10 is a perspective view showing a waveguide type optical combiner of a fourth embodiment of the invention.

The fourth embodiment of the invention will be described with reference to FIG. 10. This embodiment was fabricated by the method already described in embodiment 1. That is, it includes an optical waveguide layer 604 for light confinement in the vertical direction, waveguides 601, 602 and 603 of 4 μm wide, a reflective surface 605 and a groove 606 along the reflective surface. Groove 606 is formed by the CAIBE method already described in embodiment 1, and is preferably formed with a sufficient depth in excess of the peak of the distribution of the field in the direction along the reflective surface and perpendicular to the light beam. Waveguides 601, 602 and 603 are set about 1.5 μm off their respective central axes. Reflective surface 605 transmits a half of the light beam propagating through waveguide 603 and deflects the other half by 90° so that the split light beams go toward waveguides 601 and 602, respectively.

Figure 13:
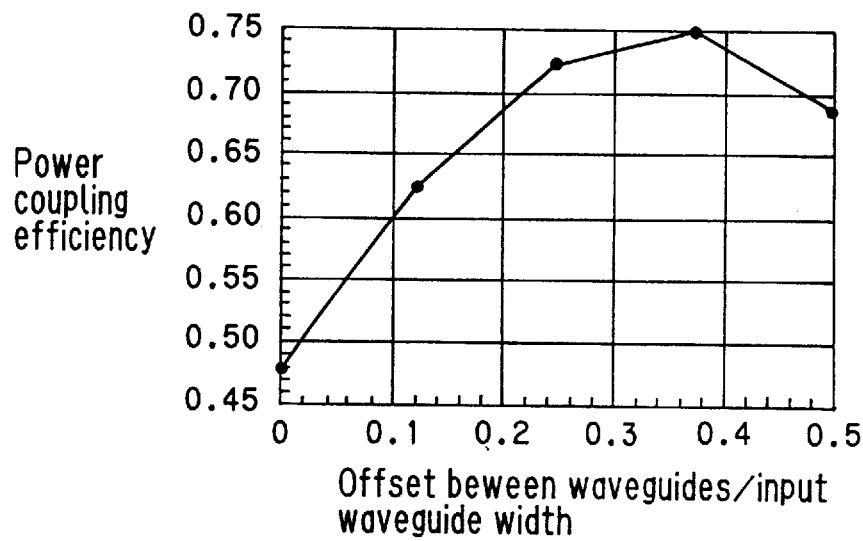
FIG. 13 is a chart showing the effect of the shift of the waveguide in the fifth embodiment of the invention.

The feature of this element will be described. This device is a beam splitter which divides the light beam propagating through waveguide 603 into two beams propagating toward waveguides 602 and 601. Upon splitting, the light beam incident on waveguide 601 has the distribution of the electric field shown in FIG. 2 or only the half part of the electric field will enter the waveguide. In this case, when the center of waveguide 601 was shifted by about 1.5 μm in the direction in which the electric field was present, the coupling efficiency between waveguides 603 and 601 could be improved by 56%. Similarly, the coupling between waveguides 603 and 602 could be bettered. The applicant hereof investigated in detail the relation between the coupling efficiency and the degree of the shift from the center of the waveguide and found that the coupling efficiency could be enhanced from 48% in the conventional configuration to 75% by providing a shift of about 20 to 50% of the width (which is closely related to the spread of the input beam) of the waveguide on the input side (see FIG. 13).

(Embodiment 5)

Figure 11:
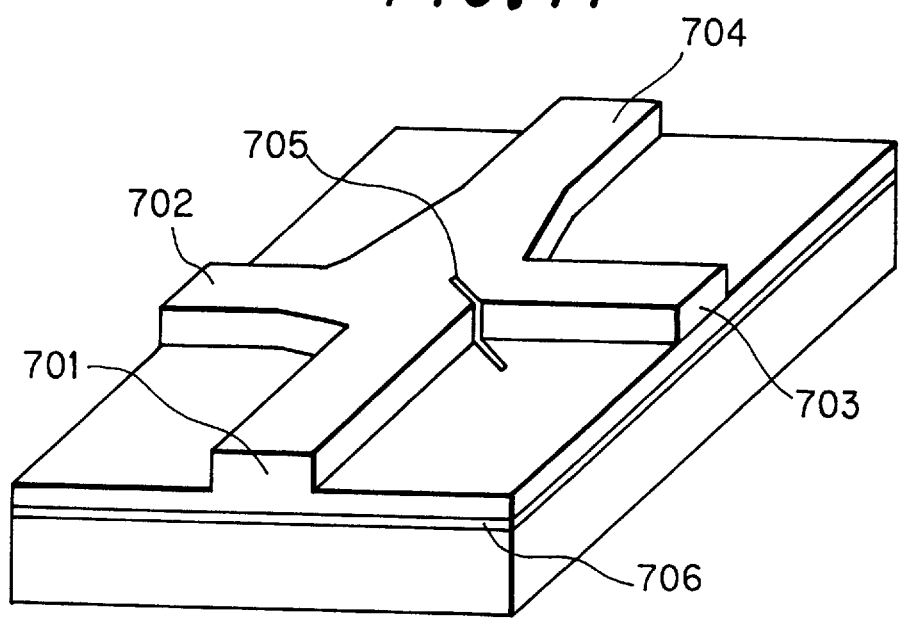
FIG. 11 is a perspective view showing a waveguide type optical combiner of a fifth embodiment of the invention.

Another embodiment of the invention will be explained. FIG. 11 shows a 2×2 beam combining/splitting device. This combining/splitting device will become effective especially when it is applied to optical wave detection using a coherent process.

Designated at 701 and 703 are optical input waveguides of a single mode type having a width of 4 μm. The light beams which have propagated through the waveguides and have been split by a BS 705 can be extracted from waveguides 702 and 704. Upon this, in order to improve the coupling efficiency of the light wave propagating from waveguide 701 to waveguide 704, the central axis of waveguide 704 should and may be shifted at a certain distance in the left direction in FIG. 11 relative to the central axis of waveguide 701. However, in this case, the coupling efficiency for the light wave from waveguide 703 to waveguide 704 becomes markedly degraded. In this embodiment, the waveguides 702 and 704 are set by a certain distance off the central axes of waveguides 701 and 703, while a tapered structure is provided at the BS portion for each of waveguides 702 and 704.

Now, description will be made of a case where this embodiment is used as an optical circuit element for optically coherent processing. This signal light introduced from the outside propagates through waveguide 701 and is split to waveguides 702 and 704 by BS 705. The locally generated light from an unillustrated laser which is abutted on the end face of waveguide 703, enters waveguide 703. This locally generated light is also guided to waveguides 702 and 704 by BS 705. Both the output light beams from waveguides 702 and 704 are detected by light receiving elements as beat signals. In order to reduce the noise of the beat signal, it is preferable that the ratio of power between the signal light and the locally generated light is 1:1. Further, the beat signal detected by each light receiving element is balance-received in order to reduce in-phase noise. For this purpose, the splitting ratio of the BS is preferably as close to 1:1 as possible. In this embodiment, waveguides 702 and 704 were shifted downwards and leftwards, respectively as shown in FIG. 11, in order to enhance the coupling efficiency of the signal light to waveguides 702 and 704, while the coupling efficiency of the locally generated light to waveguides 702 and 704 is suppressed so that the beat signal having less noise could be obtained. Besides, in waveguides 702 and 704, the connecting portions with the BS are made wider (8 $\mu$m), the width varies continuously so as to form a tapered structure. In this way, even if the manufacture accuracy of groove 704 forming the BS portion is degraded, the coupling efficiency with waveguide 702 or 704 and the splitting ratio will not vary greatly, thus improving the production yield of the element.

FIG. 11 shows schematic depiction, but in practice, for the test element, the tapered portions in waveguides 702 and 704 were made 8 $\mu$m wide and 500 $\mu$m long so that the mode converting loss due to the tapered structure could sufficiently be suppressed.

In this embodiment, the element was designed by using the tapered structure so that the mode converting loss could be sufficiently suppressed. Further, it was also confirmed that when, in the same design, the waveguide on the output side was made wider than the waveguide on the input side, the mode converting loss could be made small.

(Embodiment 6)

Figure 12:
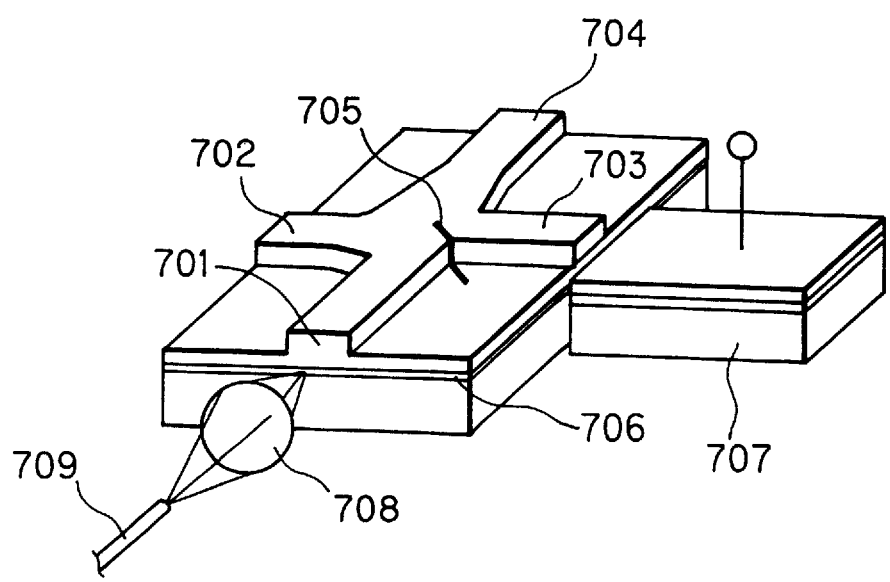
FIG. 12 is an application example of the waveguide type optical combiner of the fifth embodiment of the invention.

FIG. 12 shows an optical circuit device of an integrated type using the optical circuit element shown in the fifth embodiment of the invention. FIG. 12 is an optical circuit device of an integrated type for optically coherent detection. Here, the same reference numerals as in FIG. 11 are used. In FIG. 12, a DFB laser 707 is joined in the abutted manner on the end face of waveguide 703 so that the locally generated light will be introduced to waveguide 703. A signal light is transmitted through an optical fiber 709. The emitted beam from the outgoing end face is focused by a lens 708 on the end face of waveguide 701. Upon the arrangement, the distribution of light at the focused point by lens 708 should be made to approximately correspond to the near-field pattern of waveguide 701.

In this geometry, the signal light and the locally generated light propagate through waveguides 701 and 703, respectively, and are split by groove 705 toward waveguides 702 and 704. Provided on the end faces of waveguides 702 and 704 are unillustrated light receiving elements whereby the output beams are coherent detected, respectively. Upon this, noise generated in the light receiving elements due to the locally generated light and spontaneously emitted light can be removed by balance-reception. In this embodiment, an optically coherent detecting device was successfully produced which was able to detect the signal light efficiently and whose splitting ratio was not dependent upon the controllability of the process for forming groove 705.

(Embodiment 7)

Figure 15:
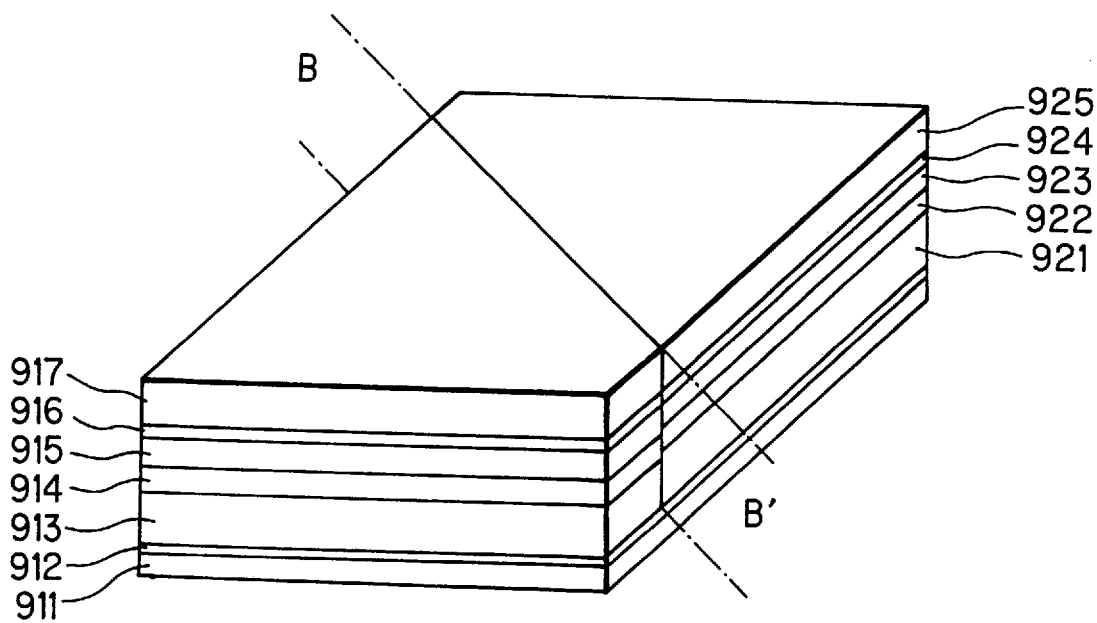
FIG. 15 is an illustration showing a production step of the waveguide type optical combiner of the seventh embodiment of the invention.

Another embodiment of the invention will be described. As shown in FIG. 15, formed on a GaAs substrate 911 are the following layers using AlGaAs: an etch stopper layer 912; a light confinement layer 913; an optical waveguide layer 914; a light confinement layer 915; an etch stopper layer 916; and a light confinement layer 917. These layers are laminated in the aforementioned order. Then, the substrate is subjected to an etching process so that a plane B–B' is exposed until etch stopper layer 912 appears. Thereafter, a light confinement layer 921, an optical waveguide layer 922, a light confinement layer 923, an etch stopper layer 924 and a light confinement layer 925 are laminated in the aforementioned order. In the process of the crystal-growth of these layers, optical waveguide layers 914 and 922 have the same thickness of 0.8 $\mu$m, and layer 922 is formed at a higher position by 0.4 $\mu$m than layer 914. Etch stopper layers 916 and 924 are made equal in thickness and height.

Figure 16:
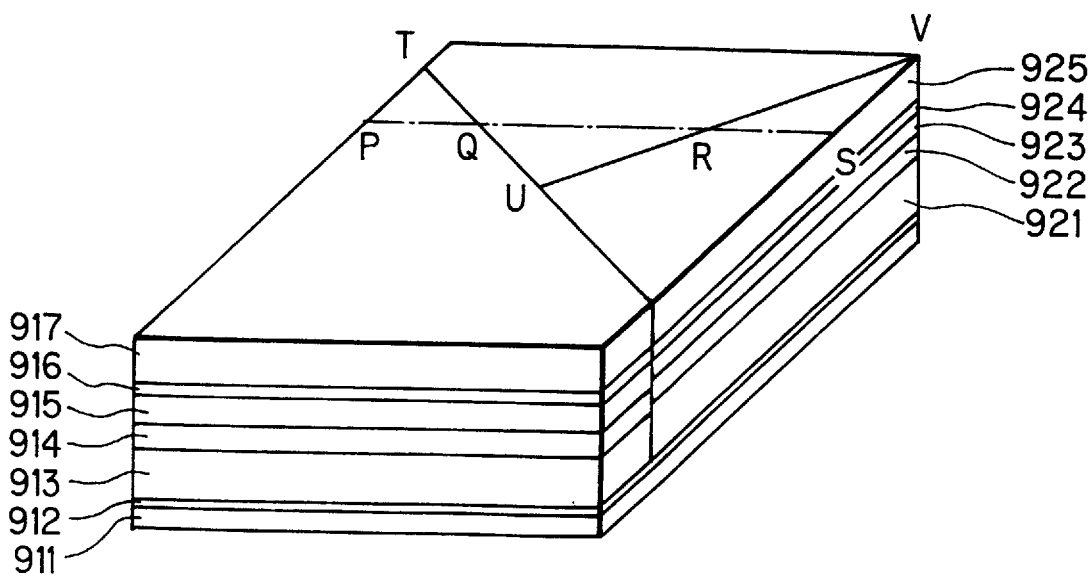
FIG. 16 is an illustration showing the following production step to that of FIG. 15 of the waveguide type optical combiner of the seventh embodiment of the invention.
Figure 17:
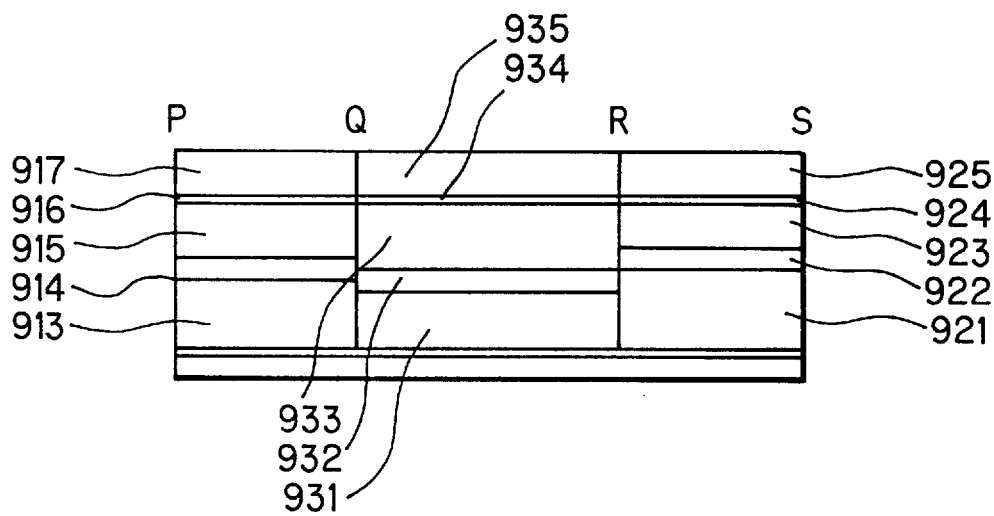
FIG. 17 is a sectional view showing the waveguide type optical combiner of the seventh embodiment of the invention.

Further, as shown in FIG. 16, a part designated by T-U-V is removed by etching and a light confinement layer 931, an optical waveguide layer 932, a light confinement layer 933, an etch stopper layer 934 and a light confinement layer 935 are laminated in that order. In the process of the crystal-growth of these layers, optical waveguide layers 914 and 932 have the same thickness of 0.8 $\mu$m, and layer 932 is formed at a lower position by 0.4 $\mu$m than layer 914. Etch stopper layers 916 and 934 are made equal in thickness and height. FIG. 17 shows a section of the thus formed substrate cut on a plane P-Q-R-S.

Figure 14:
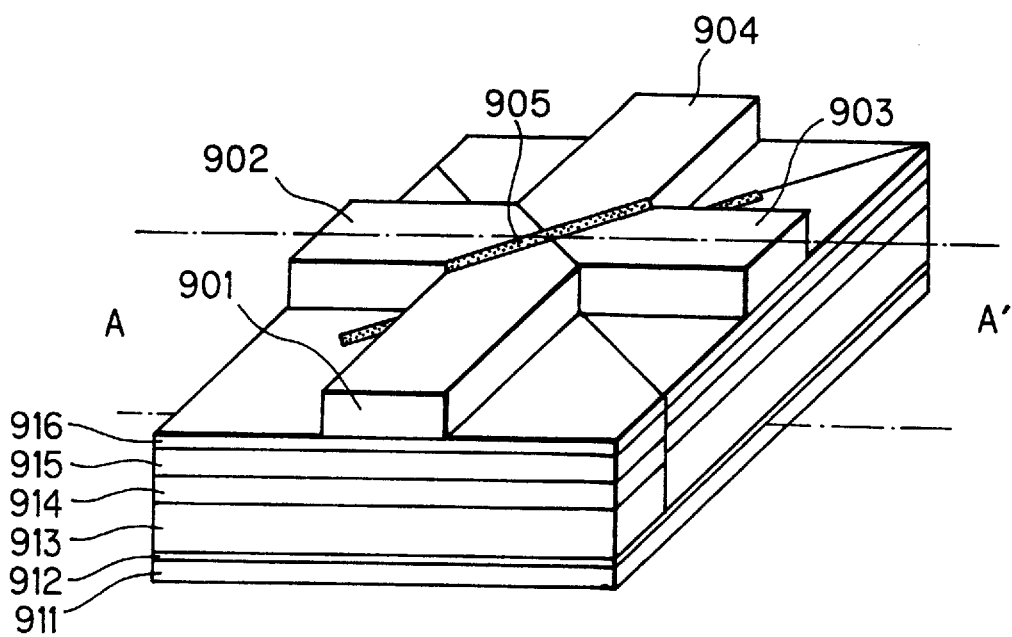
FIG. 14 is a perspective view showing a waveguide type optical combiner of a seventh embodiment of the invention.

Next, the ridged portion shown in FIG. 14 is formed by etching. In this process, two waveguides intersecting at right angles are formed in such a manner that plane B–B' is angled at 45° with the two waveguides and cuts through the center of the intersecting portion. Further, a groove 905 is formed by dry-etching so that it cuts through the center of the two waveguides and is perpendicular to plane B–B'. At this stage, the depth of etching is controlled so that the etching is stopped at the substantially center of optical waveguide layer 914. The controllability is about 0.04 $\mu$m as mentioned in embodiment 2, and it is enough to perform this process. The groove will work well as long as the length of etching sufficiently stretches across the portion for confining light in the horizontal direction.

Figure 18:
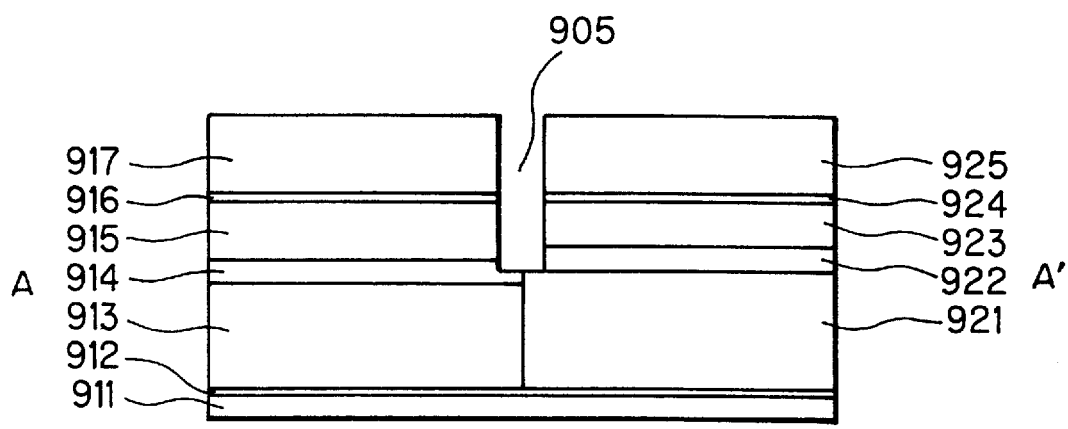
FIG. 18 is a sectional view showing the waveguide type optical combiner of the seventh embodiment of the invention.

Referring to FIG. 14, the feature of the optical combining/splitting device will be explained. Incident waveguides are those designated at 901 and 902. Here, description will be made of the incident light on waveguide 901. Light incident on waveguide 902 can be treated in the same manner. The upper half of the light propagating through waveguide 901 is reflected by groove 905 toward waveguide 903. The lower half of the light passes through the lower part of groove 905 to be incident on waveguide 904. Here, as already described in FIG. 17, optical waveguide layer 922 of waveguide 903 is formed 0.4 $\mu$m above the optical waveguide layer 914 of waveguide 901 so that the upper half of light reflected by groove 905 can be efficiently coupled to waveguide 903. Optical waveguide layer 932 of waveguide 904 is formed 0.4 $\mu$m below the optical waveguide layer 914, therefore the lower half of light having transmitted through the lower part of groove 905 can be efficiently guided to waveguide 904. FIG. 18 shows an A–A' sectional view of FIG. 14. In FIG. 18, the light propagating through the optical waveguide layer 914 is reflected by groove 905 and coupled to the optical waveguide layer 922. Further, in this embodiment, since the manufacturing accuracy of groove 905 in the depth direction is 0.04 $\mu$m, it is possible to obtain optical splitting and combining devices which have a markedly stable splitting ratio. Moreover, by varying the depth, it is possible to manufacture an optical combining and splitting device having an arbitrary splitting ratio.

Although in the above embodiment, groove 905 was formed down to the approximately middle part of optical waveguide layer 914, this configuration should not limit the invention. That is, if the splitting ratio is changed, it is possible to obtain a desired splitting ration by varying the depth of the groove.

As stated above, when a multiple number of reflective portions having a certain reflecting ratio are arranged in the beam splitting portion, the conformability of the distribution of the field of light at the beam splitting position to the eigen-mode of the waveguide on the output side becomes better with the augment of the number of the reflective portions. Thus, the mode converting loss occurring from the beam splitting position toward the waveguide on the output side becomes small. Further, the fluctuation of the splitting ratio depending upon the positional deviation becomes small, so that it is no need to perform strict positioning.

For the way of producing a portion having a certain reflecting ratio, a deep groove which exceeds the peak of the distribution of the field of light around the area is formed so that the transmission of light through the area can be neglected. Thus, it is possible to obtain the splitting ratio of light defined only by the mask pattern.

Further, it is also possible to better the conformability of the distribution of the field of light at the beam splitting position to the eigen-mode of the waveguide on the output side, by setting the central axis of the optical waveguide on the output side by a certain distance off that of the optical waveguide on the input side. Thus, the mode converting loss occurring from the beam splitting position toward the waveguide on the output side becomes small.

Moreover, by varying the width of the optical waveguide on the output side in a continuous or step-wise manner, it is possible to suppress the mode converting loss and the variations of the optical coupling efficiency and splitting ratio due to the change of the accuracy of positioning the mask at the time of forming the device element. Thus, it become possible to improve the yield.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical circuit element comprising a beam splitter which is formed with a plurality of grooves in optical waveguides to split light guided through the optical waveguides, said plurality of grooves forming a plurality of reflection portions and at least one transmission portion, wherein beams reflected by the plurality of reflection portions are combined together in a single respective waveguide of the optical waveguides to create a combined beam.

2. An optical circuit element according to claim 1, wherein said grooves are formed on a beam splitting plane in the optical waveguides so as to divide the guided light into plural beams and the divided beams are all wider than 1/10 of the wavelength of the light inside the optical waveguide.

3. An optical circuit element according to claim 1, wherein said grooves are formed so that the depth of the grooves exceeds the peak of the distribution of the field of light.

4. An optical circuit element according to claim 2, wherein the formed area of said grooves is substantially on a line or is shaped substantially in the form of a triangle when the formed area is viewed from the top of the grooves.

5. An optical circuit element according to claim 1, wherein said grooves are formed on both ends on a beam splitting plane in the optical waveguides.

6. The optical circuit according to claim 1, wherein a surface of the plurality of reflection portions is substantially linear.

7. The optical circuit according to claim 1, wherein said plurality of grooves are configured such that light split after being incident thereon has a symmetrically distributed field.

8. The optical circuit according to claim 1, wherein said plurality of grooves further form a plurality of transmission portions.

9. An optical circuit element comprising:
optical waveguides; and
grooves formed in a splitting position in the optical waveguides, wherein
light guided through optical waveguides is split by the grooves and an optical axis of an optical waveguide on an input side before the splitting position is set off that of an optical waveguide on an output side after the splitting position by about 20 to 50% of the width of the optical waveguide on the input side.

10. An optical circuit element according to claim 9, wherein the light guided through optical waveguides is split by grooves formed in the optical waveguides and the width of the optical waveguide on the input side before the beam splitting position is greater than that of the optical waveguide on the output side after the beam splitting position.

11. An optical circuit element according to claim 9, wherein the width of the optical waveguide on the output side is increased near the intersecting portion than in the other part.

12. An optical circuit element according to claim 9, wherein said grooves are formed in the form of slits on an optical splitting plane so that the guided light is divided.

13. An optical circuit element according to claim 6, wherein said grooves are provided in the form of cutout portions on an optical splitting plane so that the guided light is divided.

14. An optical circuit element according to claim 9, wherein two optical waveguides on the output side are made to intersect each other on the beam splitting plane and the intersecting angle is substantially 90°.

15. An integrated type optical circuit device comprising:
an optical circuit element having a plurality of optical waveguides on an input side and wherein light guided through optical waveguides is split by grooves formed in the optical waveguides, said grooves being formed with a depth which is at least halfway of the peak of the field of light and the width of the groove is formed so as to hold the peak light in the horizontal direction and is sufficiently greater than the distribution of the field of light; and
a plurality of input light generating sources each arranged corresponding to one of the optical waveguides on the input side.

16. An optical circuit element comprising:
an optical waveguide for guiding light therethrough; and
grooves formed in the optical waveguides, said grooves being formed with a depth which is halfway of the peak of the field of light, and a width which holds the peak light in the horizontal direction and is sufficiently greater than the distribution of the field of light.

17. An integrated type optical circuit device comprising:
an optical circuit element having a plurality of optical waveguides and grooves formed at a splitting position in the optical waveguides and wherein light guided through the optical waveguides is split by the grooves and the optical axis of an optical waveguide on an input side before the splitting position is set off that of an optical waveguide on an output side after the splitting position by about 20 to 50% of the width of the optical waveguide on the input side; and
a plurality of input light generating source each arranged corresponding to one of the optical waveguides on the input side.

18. An integrated type optical circuit device comprising:
an optical circuit element having a plurality of optical waveguides on an input side and having a beam splitter which is formed with a plurality of grooves in the optical waveguides to split light guided through the optical waveguides, said plurality of grooves forming a plurality of reflection portions and at least one transmission portion, wherein beams which have been reflected by the plurality of reflection portions are combined together in a single respective waveguide of the optical waveguides to create a combined beam; and a plurality of input light generating sources each arranged corresponding to one of the optical waveguides on the input side.

19. The integrated type optical circuit device according to claim 18, wherein a surface of the plurality of reflection portions is substantially linear.

20. The integrated type optical circuit device according to claim 18, wherein said plurality of grooves are configured such that light split after being incident thereon has a symmetrically distributed field.

21. The integrated type optical circuit device according to claim 18, wherein said plurality of grooves further form a plurality of transmission portions.

* * * * *